US012282863B2

(12) United States Patent
Slipenchuk (10) Patent No.: US 12,282,863 B2
(45) Date of Patent: Apr. 22, 2025

(54) METHOD AND SYSTEM OF USER IDENTIFICATION BY A SEQUENCE OF OPENED USER INTERFACE WINDOWS

(71) Applicant: F.A.C.C.T. ANTIFRAUD LLC, Moscow (RU)

(72) Inventor: Pavel Vladimirovich Slipenchuk, Moscow (RU)

(73) Assignee: F.A.C.C.T. ANTIFRAUD LLC, Moscow (RU)

(*) Notice: Subject to any disclaimer, the term of this patent is extended or adjusted under 35 U.S.C. 154(b) by 1110 days.

(21) Appl. No.: 17/171,087

(22) Filed: Feb. 9, 2021

(65) Prior Publication Data

US 2021/0182710 A1 Jun. 17, 2021

Related U.S. Application Data

(63) Continuation of application No. PCT/RU2019/000232, filed on Apr. 10, 2019.

(51) Int. Cl.
*G06N 5/04* (2023.01)
*G06F 21/31* (2013.01)
*G06N 20/00* (2019.01)

(52) U.S. Cl.
CPC .............. *G06N 5/04* (2013.01); *G06F 21/31* (2013.01); *G06N 20/00* (2019.01)

(58) Field of Classification Search
CPC ............ G06N 5/04; G06N 20/00; G06N 5/01; G06N 20/10; G06N 20/20; G06F 21/31;
(Continued)

(56) References Cited

U.S. PATENT DOCUMENTS 7,225,343 B1 5/2007 Honig et al.
7,496,628 B2 2/2009 Arnold et al.
(Continued)

FOREIGN PATENT DOCUMENTS

CA 2606326 A1 11/2006
CN 103491205 A 1/2014
(Continued)

OTHER PUBLICATIONS

Notice of Allowance with regard to the U.S. Appl. No. 17/171,078 mailed Jan. 22, 2024.
(Continued)

*Primary Examiner* — Cesar B Paula
*Assistant Examiner* — David Tan
(74) *Attorney, Agent, or Firm* — BCF LLP (57) ABSTRACT

A method and a system for user identification of a user in a computer system are provided. The method comprising: obtaining a user identifier associated with the user; assigning a respective window identifier to each user interface window opened by the user on the computing device; for a given working session of a pre-determined number of working sessions: storing a sequence of user interface windows opened by the user; identify, within user interface windows opened over the pre-determined number of working sessions, at least one pattern including a pre-determined number of repetitive sequences of user interface windows; generating a set of parameters characterizing a time elapsed between a transition from a first user interface window to an other user interface window within the at least one pattern; using the set of parameters associated with the at least one pattern and the user identifier to train at least one classifier.

19 Claims, 2 Drawing Sheets

(58) Field of Classification Search
CPC ....... G06F 21/30; G06F 21/316; H04L 63/08; H04W 12/06
See application file for complete search history.

(56) References Cited

U.S. PATENT DOCUMENTS

| | | |
|---|---|---|
| 7,631,362 B2 | 12/2009 | Ramsey |
| 7,712,136 B2 | 5/2010 | Sprosts et al. |
| 7,730,040 B2 | 6/2010 | Reasor et al. |
| 7,865,953 B1 | 1/2011 | Hsieh et al. |
| 7,958,555 B1 | 6/2011 | Chen et al. |
| 7,984,500 B1 | 7/2011 | Khanna et al. |
| 8,132,250 B2 | 3/2012 | Judge et al. |
| 8,151,341 B1 | 4/2012 | Gudov |
| 8,255,532 B2 | 8/2012 | Smith-Mickelson et al. |
| 8,260,914 B1 | 9/2012 | Ranjan |
| 8,285,830 B1 | 10/2012 | Stout et al. |
| 8,402,543 B1 | 3/2013 | Ranjan et al. |
| 8,448,245 B2 | 5/2013 | Banerjee et al. |
| 8,532,382 B1 | 9/2013 | Ioffe |
| 8,539,582 B1 | 9/2013 | Aziz et al. |
| 8,555,388 B1 | 10/2013 | Wang et al. |
| 8,561,177 B1 | 10/2013 | Aziz et al. |
| 8,600,993 B1 | 12/2013 | Gupta et al. |
| 8,606,725 B1 | 12/2013 | Agichtein et al. |
| 8,612,463 B2 | 12/2013 | Brdiczka et al. |
| 8,625,033 B1 | 1/2014 | Marwood et al. |
| 8,635,696 B1 | 1/2014 | Aziz |
| 8,650,080 B2 | 2/2014 | O'Connell et al. |
| 8,660,296 B1 | 2/2014 | Ioffe |
| 8,677,472 B1 | 3/2014 | Dotan et al. |
| 8,776,229 B1 | 7/2014 | Aziz |
| 8,850,571 B2 | 9/2014 | Staniford et al. |
| 8,856,937 B1 | 10/2014 | Wüest et al. |
| 8,972,412 B1 | 3/2015 | Christian et al. |
| 8,984,640 B1 | 3/2015 | Emigh et al. |
| 9,026,840 B1 | 5/2015 | Kim |
| 9,060,018 B1 | 6/2015 | Yu et al. |
| 9,185,095 B1 | 11/2015 | Moritz et al. |
| 9,210,111 B2 | 12/2015 | Chasin et al. |
| 9,215,239 B1 | 12/2015 | Wang et al. |
| 9,253,208 B1 | 2/2016 | Koshelev |
| 9,330,258 B1 | 5/2016 | Satish et al. |
| 9,338,181 B1 | 5/2016 | Burns et al. |
| 9,357,469 B2 | 5/2016 | Smith et al. |
| 9,456,000 B1 | 9/2016 | Spiro et al. |
| 9,590,986 B2 | 3/2017 | Zizi et al. |
| 9,654,593 B2 | 5/2017 | Garg et al. |
| 9,723,344 B1 | 8/2017 | Granström et al. |
| 9,736,178 B1 | 8/2017 | Ashley |
| 9,917,852 B1 | 3/2018 | Xu et al. |
| 9,934,376 B1 | 4/2018 | Ismael |
| 10,864,444 B1 * | 12/2020 | Rao .................. A63F 13/35 |
| 2002/0112048 A1 | 8/2002 | Gruyer et al. |
| 2002/0161862 A1 | 10/2002 | Horvitz |
| 2003/0009696 A1 | 1/2003 | Bunker et al. |
| 2006/0074858 A1 | 4/2006 | Etzold et al. |
| 2006/0107321 A1 | 5/2006 | Tzadikario |
| 2006/0224898 A1 | 10/2006 | Ahmed |
| 2006/0253582 A1 | 11/2006 | Dixon et al. |
| 2007/0019543 A1 | 1/2007 | Wei et al. |
| 2007/0101155 A1 | 5/2007 | Hoghaug et al. |
| 2007/0239999 A1 | 10/2007 | Honig et al. |
| 2008/0222712 A1 | 9/2008 | O'Connell et al. |
| 2009/0138342 A1 | 5/2009 | Otto et al. |
| 2009/0281852 A1 | 11/2009 | Abhari et al. |
| 2009/0292925 A1 | 11/2009 | Meisel |
| 2010/0011124 A1 | 1/2010 | Wei et al. |
| 2010/0037314 A1 | 2/2010 | Perdisci et al. |
| 2010/0076857 A1 | 3/2010 | Deo et al. |
| 2010/0115620 A1 | 5/2010 | Alme |
| 2010/0115621 A1 | 5/2010 | Staniford et al. |
| 2010/0191737 A1 | 7/2010 | Friedman et al. |
| 2010/0205665 A1 | 8/2010 | Komili et al. |
| 2010/0235918 A1 | 9/2010 | Mizrahi et al. |
| 2011/0222787 A1 | 9/2011 | Thiemert et al. |
| 2012/0030293 A1 | 2/2012 | Bobotek |
| 2012/0079596 A1 | 3/2012 | Thomas et al. |
| 2012/0087583 A1 | 4/2012 | Yang et al. |
| 2012/0158626 A1 | 6/2012 | Zhu et al. |
| 2012/0233656 A1 | 9/2012 | Rieschick et al. |
| 2012/0291125 A1 | 11/2012 | Maria |
| 2012/0324359 A1 * | 12/2012 | Lee .................. G06F 11/3438 |
| | | 715/733 |
| 2013/0086677 A1 | 4/2013 | Ma et al. |
| 2013/0103666 A1 | 4/2013 | Sandberg et al. |
| 2013/0111591 A1 | 5/2013 | Topan et al. |
| 2013/0117848 A1 | 5/2013 | Golshan et al. |
| 2013/0191364 A1 | 7/2013 | Kamel et al. |
| 2013/0263264 A1 | 10/2013 | Klein et al. |
| 2013/0297619 A1 | 11/2013 | Chandrasekaran et al. |
| 2013/0340080 A1 | 12/2013 | Gostev et al. |
| 2013/0343616 A1 | 12/2013 | Forero et al. |
| 2014/0033307 A1 | 1/2014 | Schmidtler |
| 2014/0058854 A1 | 2/2014 | Ranganath et al. |
| 2014/0082730 A1 | 3/2014 | Vashist et al. |
| 2014/0173287 A1 | 6/2014 | Mizunuma |
| 2014/0310811 A1 | 10/2014 | Hentunen |
| 2015/0007250 A1 | 1/2015 | Dicato, Jr. et al. |
| 2015/0049547 A1 | 2/2015 | Kim |
| 2015/0067839 A1 | 3/2015 | Wardman et al. |
| 2015/0163242 A1 | 6/2015 | Laidlaw et al. |
| 2015/0169854 A1 | 6/2015 | Chang et al. |
| 2015/0170312 A1 | 6/2015 | Mehta et al. |
| 2015/0200963 A1 | 7/2015 | Geng et al. |
| 2015/0220735 A1 | 8/2015 | Paithane et al. |
| 2015/0295945 A1 | 10/2015 | Canzanese et al. |
| 2015/0310196 A1 | 10/2015 | Turgeman et al. |
| 2015/0363791 A1 | 12/2015 | Raz et al. |
| 2015/0381654 A1 | 12/2015 | Wang et al. |
| 2016/0036837 A1 | 2/2016 | Jain et al. |
| 2016/0036838 A1 | 2/2016 | Jain et al. |
| 2016/0044054 A1 | 2/2016 | Stiansen et al. |
| 2016/0055490 A1 | 2/2016 | Keren et al. |
| 2016/0065595 A1 | 3/2016 | Kim et al. |
| 2016/0112445 A1 | 4/2016 | Abramowitz |
| 2016/0127907 A1 | 5/2016 | Baxley et al. |
| 2016/0149943 A1 | 5/2016 | Kaloroumakis et al. |
| 2016/0171197 A1 | 6/2016 | Song et al. |
| 2016/0191243 A1 | 6/2016 | Manning |
| 2016/0205122 A1 | 7/2016 | Bassett |
| 2016/0205123 A1 | 7/2016 | Almurayh et al. |
| 2016/0226894 A1 | 8/2016 | Lee et al. |
| 2016/0253679 A1 | 9/2016 | Venkatraman et al. |
| 2016/0261628 A1 | 9/2016 | Doron et al. |
| 2016/0267179 A1 | 9/2016 | Mei et al. |
| 2016/0285907 A1 | 9/2016 | Nguyen et al. |
| 2016/0306974 A1 | 10/2016 | Turgeman et al. |
| 2016/0307201 A1 | 10/2016 | Turgeman et al. |
| 2016/0359679 A1 | 12/2016 | Parandehgheibi et al. |
| 2017/0032250 A1 | 2/2017 | Chang |
| 2017/0034211 A1 | 2/2017 | Buergi et al. |
| 2017/0111377 A1 | 4/2017 | Park et al. |
| 2017/0134401 A1 | 5/2017 | Medvedovsky et al. |
| 2017/0140279 A1 | 5/2017 | Turgeman |
| 2017/0142144 A1 | 5/2017 | Weinberger et al. |
| 2017/0149813 A1 | 5/2017 | Wright et al. |
| 2017/0200457 A1 | 7/2017 | Chai et al. |
| 2017/0221064 A1 * | 8/2017 | Turgeman ............. H04W 12/06 |
| 2017/0230401 A1 | 8/2017 | Ahmed et al. |
| 2017/0244735 A1 | 8/2017 | Visbal et al. |
| 2017/0250972 A1 | 8/2017 | Ronda et al. |
| 2017/0272471 A1 | 9/2017 | Veeramachaneni et al. |
| 2017/0279818 A1 | 9/2017 | Milazzo et al. |
| 2017/0286544 A1 | 10/2017 | Hunt et al. |
| 2017/0289187 A1 | 10/2017 | Noel et al. |
| 2017/0295157 A1 | 10/2017 | Chavez et al. |
| 2017/0295187 A1 | 10/2017 | Havelka et al. |
| 2017/0324738 A1 | 11/2017 | Hari et al. |
| 2017/0346839 A1 | 11/2017 | Peppe et al. |
| 2018/0012021 A1 | 1/2018 | Volkov |
| 2018/0012144 A1 | 1/2018 | Ding et al. |
| 2018/0034779 A1 | 2/2018 | Ahuja et al. |
| 2018/0063190 A1 | 3/2018 | Wright et al. |

(56) References Cited

U.S. PATENT DOCUMENTS

| | | | |
|---|---|---|---|
| 2018/0096153 | A1 | 4/2018 | Dewitte et al. |
| 2018/0115573 | A1 | 4/2018 | Kuo et al. |
| 2018/0268464 | A1 | 9/2018 | Li |
| 2018/0307832 | A1 | 10/2018 | Ijiro et al. |
| 2018/0309787 | A1 | 10/2018 | Evron et al. |
| 2018/0322287 | A1 | 11/2018 | Zhao et al. |
| 2019/0089737 | A1 | 3/2019 | Shayevitz et al. |
| 2019/0207973 | A1 | 7/2019 | Peng |
| 2019/0253443 | A1* | 8/2019 | Vasudevan ............ H04L 67/12 |
| 2019/0373005 | A1 | 12/2019 | Bassett |
| 2020/0126100 | A1* | 4/2020 | Goyal ................. H04N 21/812 |
| 2020/0134702 | A1 | 4/2020 | Li |
| 2020/0244639 | A1 | 7/2020 | Arif Khan et al. |

FOREIGN PATENT DOCUMENTS

| | | |
|---|---|---|
| CN | 104504307 A | 4/2015 |
| CN | 105429956 A | 3/2016 |
| CN | 105897714 A | 8/2016 |
| CN | 106131016 A | 11/2016 |
| CN | 106202482 A | 12/2016 |
| CN | 106355450 A | 1/2017 |
| CN | 106506435 A | 3/2017 |
| CN | 106713312 A | 5/2017 |
| CN | 107392456 A | 11/2017 |
| EP | 1160646 A2 | 12/2001 |
| EP | 2410452 B1 | 1/2016 |
| EP | 2477136 B1 | 4/2018 |
| GB | 2437100 A | 10/2007 |
| GB | 2470579 A | 12/2010 |
| GB | 2493514 A | 2/2013 |
| KR | 10-2007-0049514 A | 5/2007 |
| KR | 20090022682 A | 3/2009 |
| KR | 100923179 B1 | 10/2009 |
| KR | 10-1514984 B1 | 4/2015 |
| KR | 20190018197 A | 2/2019 |
| RU | 2333532 C2 | 9/2008 |
| RU | 2382400 C2 | 2/2010 |
| RU | 107616 U1 | 8/2011 |
| RU | 2446459 C1 | 3/2012 |
| RU | 129279 U1 | 6/2013 |
| RU | 2487406 C1 | 7/2013 |
| RU | 2488880 C1 | 7/2013 |
| RU | 2495486 C1 | 10/2013 |
| RU | 2522019 C1 | 7/2014 |
| RU | 2523114 C2 | 7/2014 |
| RU | 2530210 C2 | 10/2014 |
| RU | 2536664 C2 | 12/2014 |
| RU | 2538292 C1 | 1/2015 |
| RU | 2543564 C1 | 3/2015 |
| RU | 2566329 C2 | 10/2015 |
| RU | 2571594 C2 | 12/2015 |
| RU | 2589310 C2 | 7/2016 |
| RU | 164629 U1 | 9/2016 |
| RU | 2607231 C2 | 1/2017 |
| RU | 2610586 C2 | 2/2017 |
| RU | 2613535 C1 | 3/2017 |
| RU | 2622870 C2 | 6/2017 |
| RU | 172497 U1 | 7/2017 |
| RU | 2625050 C1 | 7/2017 |
| RU | 2628192 C2 | 8/2017 |
| RU | 2636702 C1 | 11/2017 |
| RU | 2649793 C2 | 4/2018 |
| RU | 2670030 C2 | 10/2018 |
| RU | 2670906 C9 | 12/2018 |
| RU | 2681699 C1 | 3/2019 |
| WO | 0245380 A2 | 6/2002 |
| WO | 2009/026564 A1 | 2/2009 |
| WO | 2011/045424 A1 | 4/2011 |
| WO | 2011039371 A1 | 4/2011 |
| WO | 2012/015171 A2 | 2/2012 |
| WO | 2017070600 A1 | 4/2017 |
| WO | 2019/010182 A1 | 1/2019 |
| WO | 2019/035491 A1 | 2/2019 |

OTHER PUBLICATIONS

Search Report with regard to RU Patent Application No. 2019107535 completed Dec. 13, 2022.

English Description and Claims for RU2333532 retrieved on Espacenet on Dec. 28, 2022.

English Abstract for RU172497 retrieved on Espacenet on Dec. 28, 2022.

International Search Report and Written Opinion with regard to the counterpart Patent Application No. PCT/RU2019/000126 mailed Nov. 28, 2019.

English Abstract for KR100923179 retrieved on Espacenet on Dec. 3, 2020.

English Abstract for KR20090022682 retrieved on Espacenet on Dec. 3, 2020.

English Abstract for KR20190018197 retrieved on Espacenet on Dec. 3, 2020.

Wikipedia, "Keystroke dynamics", https://en.wikipedia.org/wiki/Keystroke_dynamics, accessed on Jan. 4, 2021, pdf 3 pages.

Wikipedia, "Feature extraction", https://en.wikipedia.org/wiki/Feature_extraction, accessed on Jan. 4, 2021, pdf 7 pages.

Wikipedia, "Scancode", ru.wikipedia.org/w/index.php?title=%D0%A1%D0%BA%D0%B0%D0%BD-%D0%BA%D0%BE%D0%B4&oldid=98124315, accessed on Feb. 8, 2021, pdf 9 pages.

International Search Report with regard to the Patent Application No. PCT/RU2019/000169 mailed Dec. 5, 2019.

Office Action with regard to the counterpart U.S. Appl. No. 16/194,578 mailed Feb. 18, 2022.

Brownlee, Jason "How To Implement The Decision Tree Algorithm From Scratch In Python" (Year: 2016).

English Abstract of RU107616 retrieved on Espacenet on Jul. 3, 2017.

European Search Report with regard to EP17180099 completed on Nov. 28, 2017.

European Search Report with regard to EP17191900 completed on Jan. 11, 2018.

Yoshioka et al., "Sandbox Analysis with Controlled Internet Connection for Observing Temporal Changes of Malware Behavior", https://www.researchgate.net/publication/254198606, 15 pages.

Yoshioka et al., "Multi -Pass Malware Sandbox Analysis with Controlled Internet Connection", IEICE Transactions On Fundamentals of Electronics, Communications and Computer Sciences, Engineering Sciences Society, Tokyo, 2010, vol. E93A, No. 1, p. p. 210-218.

Wikipedia, "Blockchain", https://en.wikipedia.org/wiki/Blockchain, pdf document, 18 pages.

Search Report with regard to the counterpart RU Patent Application No. 2018101764 completed Jun. 29, 2018.

Search Report with regard to the counterpart RU Patent Application No. 2018101761 completed Jun. 20, 2018.

International Search Report with regard to the counterpart Patent Application No. PCT/RU2016/000526 mailed Jun. 1, 2017.

Search Report with regard to the counterpart RU Patent Application No. 2018101760 completed Jun. 22, 2018.

Search Report with regard to the counterpart RU Patent Application No. 2018101759 completed Sep. 7, 2018.

English Abstract of RU129279 retrieved on Espacenet on Sep. 11, 2017.

English Abstract of RU164629 retrieved on Espacenet on Sep. 11, 2017.

English Abstract of RU2538292 retrieved on Espacenet on Sep. 11, 2017.

Prakash et al., "PhishNet: Predictive Blacklisting to Detect Phishing Attacks", INFOCOM, 2010 Proceedings IEEE, USA, 2010, ISBN: 978-1-4244-5836-3, doc. 22 pages.

Search Report with regard to the counterpart Patent Application No. RU2018105377 completed Oct. 15, 2018.

Search Report with regard to the counterpart RU Patent Application No. 2018101763 completed Jan. 11, 2019.

Search Report with regard to the counterpart RU Patent Application No. 2016137336 completed Jun. 6, 2017.

English Abstract of RU2522019 retrieved on Espacenet on Jan. 25, 2019.

(56) References Cited

OTHER PUBLICATIONS

Search Report with regard to the counterpart RU Patent Application No. 2017140501 completed Jul. 11, 2018.
European Search Report with regard to the counterpart EP Patent Application No. EP17211131 completed Apr. 12, 2018.
European Search Report with regard to the counterpart EP Patent Application No. EP17210904 completed May 16, 2018.
English Translation of CN106713312, © Questel—FAMPAT, Jul. 17, 201.
English Translation of CN105897714, © Questel—FAMPAT, Jul. 17, 2019.
English Translation of CN106506435, © Questel—FAMPAT, Jul. 26, 2019.
English Translation of CN107392456, © Questel—FAMPAT, Jul. 29, 2019.
English Translation of CN103491205, © Questel—FAMPAT, Jul. 29, 2019.
English Translation of CN106131016, © Questel—FAMPAT, Jul. 17, 2019.
Invitation to Respond to Written Opinion received Aug. 5, 2019 with regard to the counterpart SG Patent Application No. 10201900339Q.
Invitation to Respond to Written Opinion received Aug. 5, 2019 with regard to the counterpart SG Patent Application No. 10201901079U.
Invitation to Respond to Written Opinion received Jul. 31, 2019 with regard to the counterpart SG Patent Application No. 10201900335P.
Office Action with regard to the counterpart U.S. Appl. No. 15/707,641 mailed Apr. 25, 2019.
Russian Search Report dated Mar. 2, 2023 issued in respect of the counterpart Russian Patent Application No. RU 2019111675.
Notice of Allowance with regard to the counterpart U.S. Appl. No. 15/858,013 mailed Jun. 10, 2020.
Office Action with regard to the counterpart U.S. Appl. No. 16/270,341 mailed May 27, 2020.
Notice of Allowance with regard to the counterpart U.S. Appl. No. 15/858,013 mailed May 8, 2020.
Office Action received with regard to the counterpart U.S. Appl. No. 15/858,032 mailed Apr. 6, 2020.
Search Report with regard to the counterpart SG Patent Application No. 10201900062S mailed Dec. 5, 2019.
Search Report with regard to the counterpart SG Patent Application No. 10201900060Y mailed Dec. 5, 2019.
English Abstract for CN105429956 retrieved on Espacenet on Jan. 7, 2020.
English Abstract for CN104504307 retrieved on Espacenet on Jan. 7, 2020.
Office Action with regard to the counterpart U.S. Appl. No. 15/858,013 mailed Nov. 22, 2019.
Notice of Allowance with regard to the counterpart U.S. Appl. No. 15/707,641 mailed Oct. 30, 2019.
Whyte, "DNS-based Detection of Scanning Worms in an Enterprise Network", Aug. 2004, NOSS, pp. 1-17 {Year: 2005)—cited by Examiner in the Notice of Allowance with regard to the counterpart U.S. Appl. No. 15/707,641.
Office Action with regard to the counterpart U.S. Appl. No. 16/261,854 mailed Oct. 21, 2019.
Search Report with regard to the counterpart RU Patent Application No. 2018144708 completed Aug. 16, 2019.
Search Report with regard to the counterpart RU Patent Application No. 2018147431 completed Aug. 15, 2019.
English Translation of KR10-2007-0049514 (Description, Claims) retrieved on Espacenet on Oct. 15, 2019.
English Abstract of KR10-1514984 retrieved on Espacenet on Oct. 15, 2019.
International Search Report and Written Opinion with regard to the counterpart Patent Application No. PCT/RU2019/000232 mailed Jan. 9, 2020.
English Abstract for CN106355450 retrieved on Espacenet on Jan. 4, 2021.
English Abstract for CN106202482 retrieved on Espacenet on Jan. 4, 2021.
Wikipedia, "Focus (computing)", https://en.wikipedia.org/wiki/Focus_(computing), accessed on Jan. 4, 2021, pdf 5 pages.
Wikipedia, "Collaborative software", https://en.wikipedia.org/wiki/Collaborative_software, accessed on Jan. 4, 2021, pdf 11 pages.
Office Action issued in respect of the related U.S. Appl. No. 16/194,578 mailed Oct. 12, 2022.

* cited by examiner

METHOD AND SYSTEM OF USER IDENTIFICATION BY A SEQUENCE OF OPENED USER INTERFACE WINDOWS

CROSS-REFERENCE

The present application is a Continuation of International Application No. PCT/RU2019/000232, entitled "IDENTIFYING A USER FROM THE SEQUENCE OF WINDOWS OPENED ON A USER INTERFACE," filed on Apr. 10, 2019, the entirety of which is incorporated herein by reference.

FIELD

The present technology broadly relates to the field of cybersecurity; and, in particular, to a method and system of user identification by a sequence of opened user interface windows.

BACKGROUND

Protecting information from unauthorized access is becoming increasingly important. Methods used by violators to gain unauthorized access to other people's data, such as that of people's funds, secured, for example, by a protected resource, may include obtaining user credentials (usually a login and password) of a given user and then connecting to the protected resource using these credentials. In this respect, regardless of a particular way of gaining access to the user credentials (use of keyloggers, remote connection to a computer of the given user, theft of a mobile device not protected by password, as well as other methods, and the like), the violator's actions may not be distinguished from the actions of the given (that is, legitimate) user, under whose credentials the violator entered the protected resource.

Certain prior art approaches have been proposed for tackling the above-identified technical problem of user identification.

United States Patent Application Publication No.: 2017/032,250-A1 published on Feb. 2, 2017 and entitled "Machine Status and User Behavior Analysis System" discloses machine status and user behavior analysis system includes a detection side device and an analysis side device. The detection side device is electrically connected with the machine. The detection side device includes a data retrieving module, a sensing module, and a data processing module. The data retrieving module retrieves internal data of the machine. The sensing module senses the status of the machine to obtain sensed data. The data processing module processes the internal data of the machine and the sensed data to classify the internal data of the machine and the sensed data into machine status data and operation condition data. The analysis side device is wirelessly connected with the detection side device to receive the machine status data and the operation condition data. The analysis side device includes a data recognizing module which recognizes the machine status data to find a machine abnormal status and recognizes the operation condition data to find user behavior.

Chinese Patent No.: 106,355,450-B issued on Apr. 24, 2020 and entitled "User Behavior Analysis System and Method" discloses a user behavior analysis system and method based on a mobile network, which comprises the following steps: the system comprises a pushing module, a display module and a display module, wherein the pushing module is used for pushing promotion information containing one or more pages, and the one or more pages contain one or more interactive plug-ins; the collection module is used for collecting the interaction information of the user through the interaction plug-in; a parsing module for determining one or more tags of a repository corresponding to the interaction information, the repository associating a respective identifier with a respective tag, the identifier representing all or part of the data of the corresponding interaction information; the query module is used for receiving query requirements, determining one or more tags related to the promotion information, acquiring corresponding identifiers related to the tags, and outputting interactive information corresponding to the identifiers and user information corresponding to the interactive information. The invention can intelligently analyze a large amount of collected user behavior information and find out the target user matched with the popularization information.

Chinese Patent No.: 106,202,482-B issued on Feb. 7, 2020 and entitled "A Kind of Web Information Flow Method and System Based on User Behavior Analysis" discloses a kind of web information flow method and system based on user behavior analysis, including: collect user behavior data from electricity business's server; Described user behavior data is stored to distributed file system; Process described user behavior data by distributed algorithm, extract dimensional information, set up the user behavior analysis model corresponding with described dimensional information; By user behavior data described in described user behavior analysis model analysis, obtain the behavior common denominator data of each user, and optimize corresponding website according to described behavior common denominator data; Visible, in the present embodiment, storage and Computational frame based in a distributed manner, based on user behavior mining analysis platform, analyze user behavior, from data analysis, obtain user preference, web information flow rule and pattern, based on improving Consumer's Experience, make web information flow be truly realized and take from user and be used for user.

Russian Patent No: 2,649,793-C2 issued on Apr. 4, 2018, assigned to Group-IB Ltd, and entitled "Method and System for Detecting Remote Access During Activity on The Pages of a Web Resource" discloses a method comprising receiving data representative of a periodicity of a computer mouse movement events; generating a statistical model, the statistical model representative of a typical periodicity of the computer mouse movement events associated with a legitimate user of the electronic device; receiving an indication of computer mouse movement events from the electronic device during a browsing session of the web resource; comparing a periodicity of the computer mouse movement events with the statistical model; in response to detecting a deviation in computer mouse movement events, generating a notification determining a presence of a remote connection to the browsing session; transmitting the notification to an entity associated with the web resources.

SUMMARY

It is an object of the present technology to improve effectiveness of certain methods present in the prior art.

Broadly speaking, certain non-limiting embodiments of the present technology are directed to methods and systems for user identification of a user in a computer system by sequence of user interface windows opened by the user therein. More specifically, the methods and systems described herein are directed to determining specific patterns of opening, by the user, user interface windows in the computer system, which may be indicative of specific behavioral features of the user interacting with the computer system.

Thus, the present methods and systems, unlike those noted in the prior art, may allow for protecting user's data in the computer system from remote attacks, such as accessing the computer system using the user credentials from a remote malicious server, and the like.

More specifically, in accordance with a first broad aspect of the present technology, there is provided a method of user identification of a user in a computer system. The method is executable by a computing device associated with the computer system. The method comprises: obtaining, by the computing device, a user identifier associated with the user in the computer system; assigning, by the computing device, a respective window identifier to each user interface window opened by the user on the computing device; during a pre-determined number of working sessions of the user on the computing device, for a given working session of the pre-determined number of working sessions: storing a sequence of user interface windows opened by the user, the storing including, for a given user interface window of the sequence of user interface windows: storing a respective window identifier of the given user interface window and a respective timestamp indicative of an opening time of the given user interface window; identifying, within user interface windows opened over the pre-determined number of working sessions, at least one pattern including a pre-determined number of repetitive sequences of user interface windows opened by the user over the pre-determined number of working sessions; generating a set of parameters characterizing a time elapsed between a transition from a first user interface window to an other user interface window within the at least one pattern; using the set of parameters associated with the at least one pattern and the user identifier to train at least one classifier to identify the user by an in-use sequence of user interface windows opened therein.

In some implementations of the method, the method further comprises using the at least one classifier to identify the user in the computer system during an in-use session, the using comprising: receiving data of the in-use sequence of user interface windows including in-use user interface windows having been opened during the in-use session, wherein: each one of the in-use user interface windows is associated with a respective timestamp indicative of a time of opening thereof; applying the at least one classifier to the in-use sequence of the user interface windows to determine a likelihood parameter indicative of each of the in-use user interface windows having been opened by the user; in response to the likelihood parameter being lower than a pre-determined likelihood threshold, executing one or more pre-determined actions.

In some implementations of the method, the given user interface window is a web page.

In some implementations of the method, the at least one pattern has been selected as meeting pre-determined criteria.

In some implementations of the method, the pre-determined criteria is based on a trade-off between a pre-determined number of occurrences of the at least one pattern within the pre-determined number of working sessions and a pre-determined maximum possible length of the at least one pattern.

In some implementations of the method, the method further comprises assigning a weight value to the at least one pattern indicative of an effect of the at least one pattern on a final decision of the at least one classifier.

In some implementations of the method, the set of parameters further includes an averaged time elapsed between transitions from the first user interface window to the other user interface window over the pre-determined number of working sessions.

In some implementations of the method, the set of parameters further includes a variance value of time intervals elapsed between the transitions from the first user interface window to the other user interface window over the pre-determined number of working sessions.

In some implementations of the method, the set of parameters further includes a frequency of occurrence of the at least one pattern in the pre-determined number of working sessions of the user.

In some implementations of the method, a greater value of the frequency of occurrence has a greater effect on a final decision of the at least one classifier.

In some implementations of the method, training the at least one classifier is executed by applying one or more machine learning techniques.

In some implementations of the method, the at least one classifier comprises at least one of a probabilistic graphical model and a Support Vector Machine (SVM) classifier.

In accordance with a second broad aspect of the present technology, there is provided a system for user identification of a user. The system includes a computing device including a processor and a non-transitory computer-readable medium comprising instructions. The processor, upon executing the instructions, is configured to: obtain a user identifier associated with the user in the computer system; assign a respective window identifier to each user interface window opened by the user on the computing device; during a pre-determined number of working sessions of the user on the computing device, for a given working session of the pre-determined number of working sessions: store a sequence of user interface windows opened by the user including, for a given user interface window of the sequence of user interface windows: a respective window identifier of the given user interface window and a respective timestamp indicative of an opening time of the given user interface window; identify, within user interface windows opened over the pre-determined number of working sessions, at least one pattern including a pre-determined number of repetitive sequences of user interface windows opened by the user over the pre-determined number of working sessions; generate a set of parameters characterizing a time elapsed between a transition from a first user interface window to an other user interface window within the at least one pattern; use the set of parameters associated with the at least one pattern and the user identifier to train at least one classifier to identify the user by an in-use sequence of user interface windows opened therein.

In some implementations of the system, the processor is further configured to use the at least one classifier to identify the user in the computer system during an in-use session, by executing: receiving data of the in-use sequence of user interface windows including in-use user interface windows having been opened during the in-use session, wherein: each one of the in-use user interface windows is associated with a respective timestamp indicative of a time of opening thereof; applying the at least one classifier to the in-use sequence of the user interface windows to determine a likelihood parameter indicative of each of the in-use user interface windows having been opened by the user; in response to the likelihood parameter being lower than a pre-determined likelihood threshold, executing one or more pre-determined actions.

In some implementations of the system, the given user interface window is a web page.

In some implementations of the system, the at least one pattern has been selected as meeting pre-determined criteria.

In some implementations of the system, the computing device is an integral part of a remote banking service system.

In some implementations of the system, the computing device is an integral part of a website including a user authorization feature.

In some implementations of the system, the computing device is an integral part of a multiplayer computer game including a user authorization feature.

In some implementations of the system, the computing device is an integral part of a software and hardware system for collaborative work including a user authorization feature.

In the context of the present specification, unless expressly provided otherwise, a computer system may refer, but is not limited to, a "computing device", an "electronic device", an "operation system", a "system", a "computer-based system", a "controller unit", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid state-drives, and tape drives.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

BRIEF DESCRIPTION OF THE DRAWINGS

Non-limiting embodiments of the present technology will be described with reference to the accompanying drawings, which are presented to explain the essence of the invention and in no way to limit the scope of the present technology, wherein.

DETAILED DESCRIPTION

The following detailed description is provided to enable anyone skilled in the art to implement and use the non-limiting embodiments of the present technology. Specific details are provided merely for descriptive purposes and to give insights into the present technology, and in no way as a limitation. However, it would be apparent to a person skilled in the art that some of these specific details may not be necessary to implement certain non-limiting embodiments of the present technology. The descriptions of specific implementations are only provided as representative examples. Various modifications of these embodiments may become apparent to the person skilled in the art; the general principles defined in this document may be applied to other non-limiting embodiments and implementations without departing from the scope of the present technology.

Certain non-limiting embodiments of the present technology are directed to a computer-implemented method and system for user identification in a computer system by an opening sequence of user interface windows.

One of non-limiting example of the computer system described herein may include a remote banking service (RBS) system; however, in various non-limiting embodiments of the present technology, the computer system may also include, without limitation, online computer games, collaboration software, online store software, and the like.

According to certain non-limiting embodiments of the present technology, the computer system may include a computing environment, such as a computing device 200 described herein below with reference to FIG. 2.

Method

Figure 1:
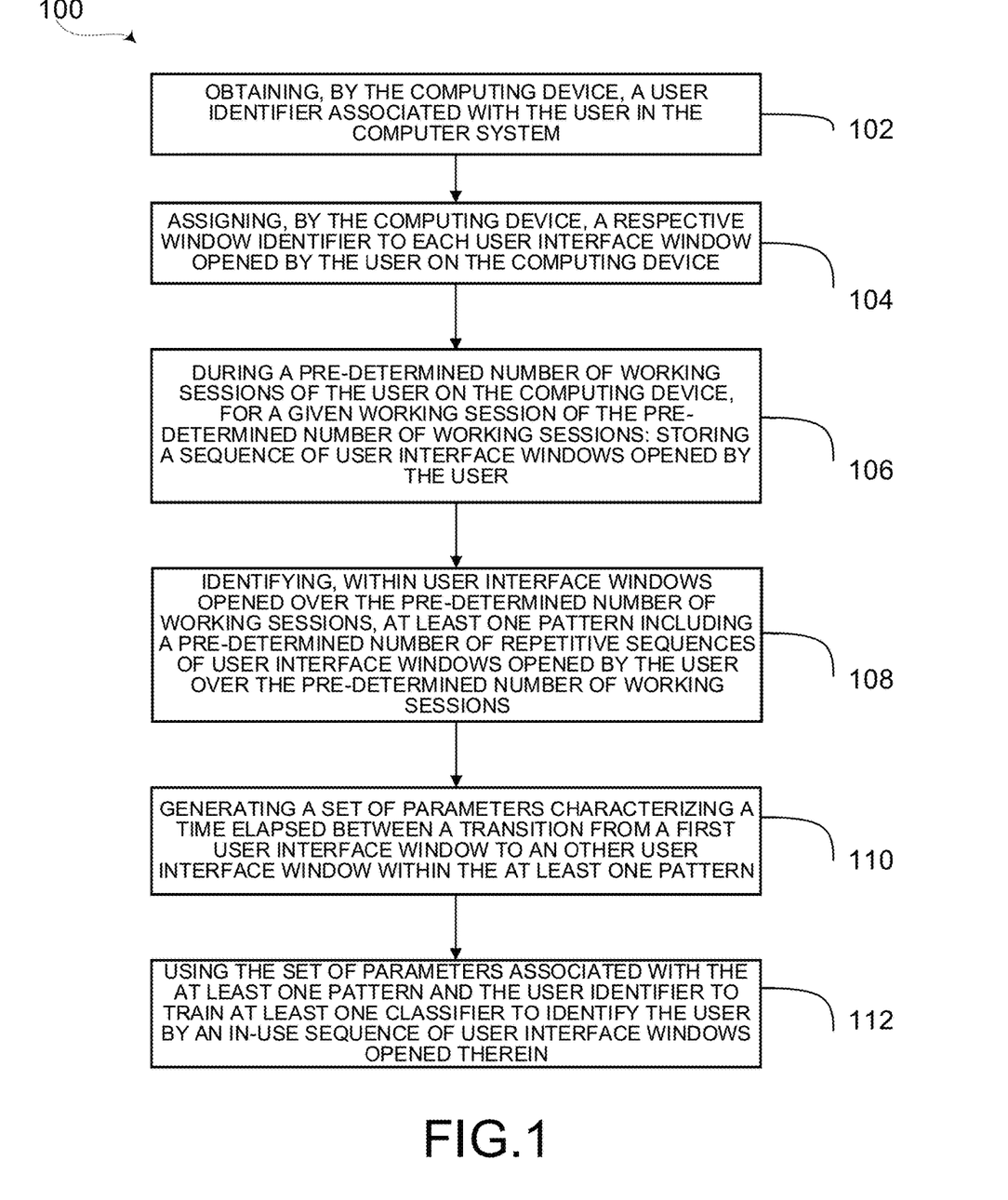
FIG. 1 depicts a flow chart of a computer-implemented method of user identification of a user in a computing system by sequence of opened user interface windows, in accordance with certain non-limiting embodiments of the present technology.

With reference to FIG. 1, there is depicted a flow chart diagram of a method 100 for user identification of the user in the computer system by a sequence of opened user interface windows, in accordance with certain non-limiting embodiments of the present technology. The method 100 may be executed by a processor 201 of the computing device 200.

Step 102: Obtaining, by the Computing Device, a User Identifier Associated with the User in the Computer System;

The method 100 commences at step (102) with the processor 201 being configured to obtain, for the computer system, a user identifier of the user. In some non-limiting embodiments of the present technology, the user identifier may have been predetermined based on user in the computer system including username and password.

Further, in certain non-limiting embodiments of the present technology, the processor 201 may be configured to assign the user identifier to the user.

The method 100 thus proceeds to step 104.

Step 104: Assigning, by the Computing Device, a Respective Window Identifier to Each User Interface Window Opened by the User on the Computing Device At step (104), in some non-limiting embodiments of the present technology, the processor 201 may be configured to assign a respective window identifier to each of user interface window that the user has opened on the computer system using the computing device 200.

The method 100 thus proceeds to step 106.

Step 106: During a Pre-Determined Number of Working Sessions of the User on the Computing Device, for a Given Working Session of the Pre-Determined Number of Working Sessions: Storing a Sequence of User Interface Windows Opened by the User At step (106) in some non-limiting embodiments of the present technology, in each working session of the user, the processor 201 may be configured to record and store a sequence of user interface windows opened by the user. More specifically, in this respect, for a given user interface window opened by the user, the processor 201 may be configured to obtain and store a respective window identifier associated therewith of the given window and a timestamp indicative of an opening time of given window.

Thus, at step (106), the processor 201 may be configured to aggregate, during a predetermined number of working sessions of the user in the computer system, data of a plurality of user interface windows opened by the user in the computer system.

The method 100 hence advances to step 108.

Step 108: Identifying, within User Interface Windows Opened Over the Pre-Determined Number of Working Sessions, at Least One Pattern Including a Pre-Determined Number of Repetitive Sequences of User Interface Windows Opened by the User Over the Pre-Determined Number of Working Sessions Further, at step (108), according to certain non-limiting embodiments of the present technology, the processor 201 may be configured to identify, in the plurality of user interface windows opened by the user in the predetermined number of working sessions, at least pattern. According to some non-limiting embodiments of the present technology, the at least one pattern may include a pre-determined number of repetitive sequences of user interface windows opened by the user over the pre-determined number of working sessions.

The method 100 thus proceeds to step 110.

Step 110: Generating a Set of Parameters Characterizing a Time Elapsed Between a Transition from a First User Interface Window to an Other User Interface Window within the at Least One Pattern Further, at step (110), the processor 201 may be configured to generate, for each user interface window of the at least one pattern, a set of parameters characterizing a time elapsed between a transitions, within the at least one pattern, from a given user interface window to an other user interface window.

Thus, according to certain non-limiting embodiments of the present technology, at step (110), the processor 201 may be configured to identify and store a plurality of patterns associated with the user; and based on associated sets of parameters determined for each pattern, the processor 201 may be configured to generate a training set of data to train at least one classifier to identify the user by an in-use sequence of visited pages.

The method 100 thus advances to step 112.

Step 112: Using the Set of Parameters Associated with the at Least One Pattern and the User Identifier to Train at Least One Classifier to Identify the User by an in-Use Sequence of User Interface Windows Opened Therein.

Finally, at step (112), according to certain non-limiting embodiments of the present technology, based on the training set of data, the processor 201 may be configured to train the at least one classifier to identify the user in the computer system by the in-use sequence of user interface windows opened during in-use working sessions.

In some non-limiting embodiments of the present technology, the method 100 can be implemented as an authorized remote access service including user interface windows or working zones in one complex user interface window further including a feature to switch between them (both windows and zones).

Below are given certain non-limiting examples of implementation of the above-described method 100, in accordance with certain non-limiting embodiments of the present technology.

Example Implementations

In some non-limiting embodiments of the present technology, the method 100 can be implemented in the form of an Internet program (script), functioning on a website of a bank providing the RBS.

In other non-limiting embodiments of the present technology, the method 100 can be executed by a subsystem of the "thin client" of RBS, for example, an Internet application that runs on a user electronic device of the user including, for example, a smartphone, a mobile phone, etc., and exchanges data with a server of the bank on which the RBS system is installed and operates.

In yet other non-limiting embodiments of the present technology, the method 100 can be executed by a subsystem of a software and hardware complex operating in a cloud environment and exchanging data with "thin clients", such as ATMs, and with a processing center of the bank.

In additional non-limiting embodiments of the present technology, the method 100 can be executed by distributed software and/or hardware system located on different Internet servers, for example, for the purpose of load distribution, and simultaneously serving multiple RBS channels belonging to different banks.

In other non-limiting embodiments of the present technology, the method 100 can be implemented in a program or service for collaboration, which includes authorized user access (for such programs or services, see ru.wikipedia.org/w/index.php?title=%D0%9F%D1%80%D0%BE%D0%B3%D1%80%D0%B0%D0%BC%D0%BC%D0%BD%D0%BE%D0%B5_%D0%BE%D0%B1%D0%B5%D1%81%D0%BF%D0%B5%D1%87%D0%B5%D0%BD%D0%B8%D0%B5_%D1%81%D0%BE %D0%B2%D0%BC%D0%B5%D1%81%D1%82%D0%BD%D0%BE%D0%B9_%D1%80%D0%B0%D0%B1%D0%BE%D1%82%D1%8B&oldid=80620207). In yet other non-limiting embodiments of the present technology, the method 100 can be implemented in a multiplayer computer game including a feature of authorization of users.

Below, the example implementation of the method 100 in the computer system including the RBS system will be described in greater detail, according to certain non-limiting embodiments of the present technology. As noted above, this implementation of the method 100 is not limiting.

In some non-limiting embodiments of the present technology, the user identifier is at least one combination of characters that may uniquely characterize a given user, such as the user. For example, the user identifier can be a hash function from a phone number of the electronic device from which the RBS is accessed. In other non-limiting embodiments of the present technology, the user identifier can be agent_id (internal client identifier used in the banking system). In yet other non-limiting embodiments of the present technology, the user identifier can be a bank card number of the user, or a result of a biometric identification of the user or a hash function of such a result.

In some non-limiting embodiments of the present technology, the user identifier can be a value of a function of a set of information about the software and hardware configuration of a personal computer used by the user to access the RBS.

In yet other non-limiting embodiments of the present technology, to generate the user identifier, the processor 201 may be configured to apply a hash function to a character string obtained by concatenating identifiers obtained from the RBS.

Generally speaking, the user identifier may be encrypted on the RBS side; its decoding is not required for the implementation of the method 100, and the way in which it was generated is not limited. Further, the user identifier can be unique and consistently reproducible during each session of accessing the RBS using the credentials (login and password) of the user.

For simplicity and clarity of further description, the user identifier may be represented as USER(i), where different values of i indicate different users.

Further, in some non-limiting embodiments of the present technology, the processor 201 may be configured to generate and assign the respective window identifier to the given user interface window. In some non-limiting embodiments of the present technology, the respective window identifier can include at least one combination of characters that is uniquely associated with the given user interface window.

For example, in those non-limiting embodiments of the present technology where the given user interface window is a web site page, the processor 201 can be configured to generate the respective window identifier by applying a hash function to an associated URL and/or to a title (a sequence of characters placed under the <title> tag) of the. In other non-limiting embodiments of the present technology, the given user interface window can be an interface element of a program running on the electronic device of the user and/or in the ATM. In this regard, the processor 201 can be configured to generate the respective window identifier by applying a hash function to a name of this interface element or its another designation used in the program.

Thus, in some non-limiting embodiments of the present technology, the processor 201 may be configured to generate the respective window identifier that can be unique within the framework of the RBS and consistently reproducible with each successful act of accessing the given interface window.

It yet additional non-limiting embodiments of the present technology, the processor 201 may be configured to generate respective window identifier by hashing a character string obtained by concatenating identifiers received from the RBS.

In those non-limiting embodiments of the present technology, where the given user interface window has several working areas, the processor 201 can be configured to generate the respective window identifier as an input focus—(see the following for more details: ru.wikipedia.org/w/index.php?title=%D0%A4%D0%BE%D0%BA%D1%83%D1%81_(%D0%BF%D0%BE%D0%BB%D1%8C%D0%B7%D0%BE%D0%B2%D0%B0%D1%82%D0%B5%D0%BB%D1%8C%D1%81%D0%BA%D0%BE%D0%B8%D0%B9_%D0%B8%D0%BD%D1%82%D0%B5%D1%80%D1%84%D0%B5%D0%B9%D1%81)&stable=1, i.e. some sequence of service characters generated by the program, which is associated with the given user interface window, and carrying information about which of the numerous interface elements of the program (buttons, pop-up lists, radio buttons, text input windows, etc.) is currently active and ready to take user commands.

Conversion of such a sequence into the respective window identifier can be performed, for example, by the processor 201 applying a hash function to the sequence of characters itself or by any other method.

Hereafter, the respective window identifier is indicated as PAGE(j), wherein a different j value points to a different user interface windows, or a different user interface elements in a user interface window, in those embodiments where the given user interface window has several working areas.

Further, in some non-limiting embodiments of the present technology, the processor 201 may be configured to obtain an additional identifier of the bank, with which the RBS is associated, or in other words, which is associated with the one or more USER(i); PAGE (j).

The additional identifier may be indicated as BANK(q); and in some non-limiting embodiments of the present technology, the additional identifier may be static, may be generated only once, when the RBS system of the bank has been configured and launched. For example, the additional identifier can be an SSL certificate that subscribes the sites of the bank, or a separate character string, for example, BANK(q)=SBERBANK, transferred from each bank's RBS. BANK(q) identifier is used for the primary sorting of information received by the RBS and for addressing the response signals of the RBS to the bank antifraud department.

According to certain non-limiting embodiments of the present technology, the processor 201 can be configured to receive the user identifier and the respective window identifier, USER(i); PAGE(j) from the RBS always in pairs and simultaneously, each accompanied by a timestamp. In fact, it may take some time between the receipt of the first and second identifiers, due to signal delays in the physical communication lines used by the RBS, but we neglect this time within the scope of the implementation of the claimed method, considering the receipt time of the last one of the identifiers to be the receipt time of the identifiers.

According to certain non-limiting embodiments of the present technology, the processor 201 can be configured to organize the received data in data sequences respectively associated with working sessions (S) of the user, as expressed by Equation (1) below:

$$S=\{USER(i);PAGE(1);t_1\},\{USER(i);PAGE(2),t_2\},\ldots\{USER(i);PAGE(N),t_N\}, \quad (1)$$

wherein $t_1$ is a timestamp corresponding to an opening time of PAGE(1) user interface window by the USER(i) user, $t_2$ is a timestamp corresponding to an opening time of PAGE (2) user interface window by the same user, and so on.

As it can be appreciated, the user identifier in each pair is the same, i.e. a given working session is always associated with a specific user describing work thereof in the RBS.

In general, a significant number of sessions exist at the same time in the RBS system, since many different users can work simultaneously with the RBS system. A common practice in banks is to record (save) all sessions and store this information for a certain time (from several months to several years, as an example). Thus, in some non-limiting embodiments of the present technology, the processor 201 can be configured to obtain this array of information including a predetermined number of working sessions associated with the user from the bank, and use this array of information for training the at least one classifier as described above.

As it may become apparent, in an array that covers a relatively long time period (for example, a month), along with sessions of legitimate users, there will also be sessions of violators. However, it is known that the frequency of access of violators to the RBS system is extremely negligible. Thus, the majority of sessions stored over long periods of time may be considered as sessions of legitimate users. Since the training of the at least one classifier is essentially an accumulation and statistical analysis of information, the presence of a small number of illegitimate sessions will not affect the quality and results of training.

Thus, according to certain non-limiting embodiments of the present technology, the processor 201 may be configured to generate the training set of data associated with the user identifier of the user USER(i). More specifically, each pair of USER(i); PAGE(j) identifiers, as expressed by Equation (1), is further associated with a respective timestamp t(j). Therefore, for a given pair USER(i); PAGE(j), except for the very first pair in each session, the processor 201 can be configured to receive (or otherwise, determine) a respective time interval T between a moment of receipt of the given pair and a moment of receipt of a previous pair, preceding the given. The processor 201 can be configured to determine the respective time interval T as a difference of timestamps (t) calculated with a given accuracy, for example, with an accuracy of 0.01 seconds. For example, a time interval between a first pair and a second pair of identifiers in each working session of the user can be determined as $T=t_2-t_1$, etc.

Thus, according to certain non-limiting embodiments of the present technology, the processor 201 may be configured to store the given pair of identifier associated with the respective time interval.

The sequence of data (1), recorded for the user including the so determined time intervals may be expressed by the following equation:

$$PAGE(j)—T(j)—PAGE(j+1)—T(j+1)—PAGE(j+2)—T(j+2)—\ldots—Tn-1—PAGE(j+N), \quad (2)$$

where T(j)—is the respective time interval in seconds and fractions of a second (not necessarily integer) that elapsed between the moment when the user opened the PAGE(j) user interface window and the moment when the same user opened the PAGE(j+1) user interface window.

It should be noted that there can be no relation between the PAGE(j) and PAGE(j+1) user interface windows themselves (for example, web pages) in the RBS. For example, there can be no logical relation therebetween, such as a request expressed in a text message from the PAGE(j) user interface windows to go to the PAGE (j+1) user interface windows; nor there can be a physical relation therebetween, such as hyperlinks leading from the one page to the other. Such transitions are formed in the sessions of bots, i.e. programs that simulate a particular activity of the RBS.

Thus, in some non-limiting embodiments of the present technology, for the user identifier USER(i), the processor 201 may be configured to receive data of user interface windows opened by the user in a plurality of working sessions of the user in the RBS, as illustratively expressed by Equations (3) below.

$$S1=PAGE(5)\text{-}8\text{-}PAGE(9)\text{-}51\text{-}\ldots\text{-}PAGE(2)\text{-}6\text{-}PAGE(6)\text{-}4\text{-}PAGE(33)\text{-}12\text{-}PAGE(21)$$

$$S2=PAGE(8)\text{-}88\text{-}PAGE(35)\text{-}\ldots\text{-}PAGE(6)\text{-}5\text{-}PAGE(33)\text{-}10\text{-}PAGE(21)\text{-}31\text{-}PAGE(2)$$

$$S3=PAGE(6)\text{-}4\text{-}PAGE(33)\text{-}18\text{-}PAGE(21)\text{-}\ldots\text{-}PAGE(54)\text{-}93\text{-}PAGE(5)\text{-}11\text{-}PAGE(9)\ldots$$

$$Sk=PAGE(94)\text{-}11\text{-}PAGE(62)\text{-}52\text{-}\ldots\text{-}PAGE(5)\text{-}42\text{-}PAGE(9)\text{-}30\text{-}PAGE(72) \quad (3)$$

When a number of working sessions Sk in the plurality of working sessions exceeds a predetermined threshold (for example, 20), the processor 201 may be configured to analyze the plurality of working sessions to identify at least one pattern therein, as described above in respect of step 108 of the method 100. For example, the processor 201 may be configured to identify a repeating sequence of pages, similar to the PAGE(6)-PAGE(33)-PAGE(21) sequence underlined in Equation (3) as being a pattern. Time intervals T(j) at the pattern identification step are not taken into account.

It should be noted that the present example in respect of the generating the training set of data is described in respect of a single user (that is, the user), as according to certain non-limiting embodiments of the present technology, working sessions of different users are never analyzed together.

Further, according to certain non-limiting embodiments of the present technology, a length of the at least one pattern, i.e. a number of user interface windows therein, can be predetermined. In some non-limiting embodiments of the present technology, the length of the at least one pattern can be specified by an interval. For example, if the length from 3 to 6 is predetermined, then the processor 201 may be configured to identify a sequence of PAGE(6)-PAGE(33)-PAGE(21), having a length of 3, as a pattern; and further may be configured to discard a sequence of PAGE(5)-PAGE(9) (bolded in Equation (3)), having a length of 2. In other non-limiting embodiments of the present technology, the length of the at least one pattern can be predetermined to be a fixed value, for example, 4.

In yet other non-limiting embodiments of the present technology, the processor 201 can be configured to determine the length of the at least one pattern automatically, based on a number of occurrences thereof identified in the plurality of working sessions associated with the user. In these embodiments, the processor 201 is configured to start searching for occurrences of the at least one pattern, for example, at a given length of 3. Further, if and when the number of occurrences of the at least one pattern identified in the plurality of working sessions exceeds a predetermined threshold (for example, 10), the processor 201 can be configured to increase the length of the at least one pattern by one and the search is repeated, discarding the previously found shorter patterns. Thus, the processor 201 can be configured to execute such a cycle until the number of occurrences of the at least one pattern smaller than the predetermined threshold and having a maximum possible length is found.

Further, in some non-limiting embodiments of the present technology, the processor 201 may be configured to assign to each user interface window of the at least one pattern an a priori weight value.

In the context of the present specification, a "weight value" denotes a predetermined number associated with a given pattern and stored in computer system that implements the method 100, such as the RBS in the present example.

For example, assume the at least one pattern includes a PAGE(m) user interface window, which serves in the interface of the RBS for requesting transfers of funds of the user to a bank account or to a wallet of a cashless payment system; thus, the processor 201 can be configured to assign to the PAGE (m) an increased weight value, for example, 3 times greater than respective weight values of other patterns.

In some non-limiting embodiments of the present technology, the processor 201 can be configured to assign this weight value to any patterns including the PAGE(m) user interface window, no matter in which particular USER(i) user's sessions these patterns have been found.

In another example, the processor 201 can be configured to assign to patterns including a PAGE(x) user interface window, which serves to pay utility bills or taxes in the interface of the RBS, a reduced weight value, for example, 0.3 of the respective weight value of unmodified patterns.

According to certain non-limiting embodiments of the present technology, the processor 201 can be configured to use these weight values both at the step of training the at least classifier described above with respect to step 112 of the method 100, and at the step of controlling the user's identity. Such weight values make sense when the RBS is sensitive to an event of a certain type. In this example, an atypical behavior of any user in a high-risk scenario, comprising the PAGE(m) window, will "alarm" the RBS much more than an atypical behavior in a tax payment scenario, where the probability of appearance of a violator taking over other people's credentials approaches zero.

Further, as described above with respect to step 110 of the method 100, the processor 201 may be configured to generate, for the at least one pattern identified in the plurality of working sessions, a set of parameters characterizing the behavior of the user working with the RBS. According to certain non-limiting embodiments of the present technology, the processor 201 is configured to generate the set of parameters based on data received via the plurality of working sessions associated with the user.

In some non-limiting embodiments of the present technology, a first parameter may be a time vector V. Broadly speaking, the time vector V is a vector whose dimension corresponds to the number of time intervals within the at least one pattern. For example, for the PAGE(6)-PAGE(33)-PAGE(21) pattern, the time vector will be two-dimensional: V=(Tavg1, Tavg2), where Tavg1 is a time characteristic for the associated user, calculated by a pre-determined algorithm, between the opening of PAGE(6) and PAGE(33) user interface windows, and Tavg2 is a time characteristic indicative of a time interval between the opening of PAGE(33) and PAGE(21) user interface windows.

In some non-limiting embodiments of the present technology, the processor 201 can be configured to determine Tavg1 and Tavg2 by averaging respective time intervals T(j) between PAGE(6) and PAGE(33) pages, as well as between pages PAGE(33) and PAGE(21) over all occurrences of associated patterns found in the plurality of working sessions associated with the user.

The averaging of the respective time intervals, for example, Tavg1, can include an arithmetic average of all times T1 for all occurrences of an associated pattern found in the plurality of working sessions associated with the user.

In other non-limiting embodiments of the present technology, the processor 201 can be configured to determine a geometric average over all the occurrences of the associated pattern. In yet other non-limiting embodiments of the present technology, the processor 201 can be configured to determine one of the Tavg1 and the Tavg2 as a weighted average, wherein the processor 201 uses a number of user interface windows separating a given interval from a respective one of the initial time interval T1 and the initial time interval T2 or from the respective final time intervals of the respective pattern as a weight value for each time interval Ti. Thus, in these embodiments, time intervals at the beginning or at the end of a given working session of the user have greater effect on the one of the Tavg1 and the Tavg2

Further, in other non-limiting embodiments of the present technology, the time vector V may have a dimension of 2*n, where n is the number of time intervals within the at least one pattern. In this case, the time vector V stores both the calculated values of the time interval Tavg and associated variance values D. The variance here is an indicator of how Tavg varies for the user of the plurality of working sessions. Such vector of 2*n dimension might look as follows: V=(Tavg1, D1, Tavg2, D2).

In some non-limiting embodiments of the present technology, the processor 201 can be configured to determine the variance value D1 on the basis of the plurality of working sessions of the user as a variance of the random variable Tavg1, as an example. Similarly, the processor 201 can be configured to determine the variance value D2 as a variance of the random variable Tavg2.

In additional non-limiting embodiments of the present technology, the processor 201 can further be configured to determine a frequency of occurrence of the at least one pattern indicating how often the at least pattern occurs in the plurality of working sessions of the user. According to non-limiting embodiments of the present technology, the processor 201 can be configured to determine the frequency of occurrence as a ratio of the number of occurrences of the at least one pattern L to the number of sessions in the plurality of sessions. Thus, a value of the frequency of occurrence can be less than 1 if the at least one pattern is not found in each and every working session of the plurality of working, or more than 1, if the at least one pattern occurs several times during in each one of the plurality of working sessions, as expressed by Equation (4) below.

$$\lambda = L/K \quad (4)$$

In some non-limiting embodiments of the present technology, the processor 201 can be configured to store the set of parameters associated with the at least one patterns for inclusion thereof in the training set of data, as described above with regard to step 110 of the method 100. Further, the processor 201 can be configured to identify more patterns within user interface windows of the plurality of working sessions for generating the training set of data, such as hundreds, thousands, or even hundreds of thousands of patterns. Also, to tackle a problem of sparsity of data, the processor 201 can be configured to increase the predetermined number of working sessions of the plurality of working sessions, associated with the user, used for the generating the training set of data.

Further, as described above with respect to step 112 of the method 100, the processor 201 can be configured to train, based on the so-generated training set of data, the at least one classifier. In this regard, the at least one classifier to identify the user in in-use (that is, future) working sessions thereof in the RBS. According to non-limiting embodiments of the present technology, the at least one classifier may comprise, for example, and not as a limitation, at least one of a probabilistic graphical model (Random Forest) and an SVM classifier.

Accordingly, patterns of the training set of data that have been assigned greater respective weight values may have a proportionately greater effect on a final decision of the trained at least one classifier, and vice versa. In a similar way, respective values of the frequency of occurrence associated with the patterns can also be used at this step as an increasing or decreasing factor.

In some non-limiting embodiments of the present technology, the at least one classifier may comprise (1) a first classifier trained based on a training set of data including averaged time intervals, and (2) a second classifier trained based on a training set of data including variance values of the averaged time intervals.

It should be noted that steps 106 to 112 of the method 100 and associated example implementations thereof may be executed, by the processor 201, online directly, for example, during the operation of the RBS.

In other non-limiting embodiments of the present technology, the processor 201 can be configured to execute the steps of the training the at least one classifier offline. In these embodiments, the processor 201 can be configured to receive an array of data previously saved by the RBS for analysis, performs data analysis as described above, trains the at least one classifier for all users whose identifiers were in the received data array. When the analysis is completed and the at least one classifier is trained, the processor 201 can be configured to continue the operation in an online mode and then functions together with the RBS.

Further, in some non-limiting embodiments of the present technology, the processor 201 can be configured to apply the so trained at least one classifier to the in-use sequence of user interface windows opened during the in-use working session to identify the user in the computer system. To that end, the processor 201 can be configured to receive, in the in-use working session, the user identifier USER(i) of the user, and further apply the trained at least one classifier to this USER (i). All data from the in-use working session is fed to the input of the at least one classifier. Thus, the processor 201 can be configured to identify the user directly during the work of the user with the RBS.

According to some non-limiting embodiments of the present technology, the at least one classifier may be configured to make a decision in a form of a numerical estimate of the probability that a user of the in-use session of the RBS system under the USER(i) is the same user, the training set of data associated with whom was used for training the at least one classifier. This decision is constantly updated during the in-use working session, i.e. the decision of the at least one classifier is revised upon receipt of each regular {USER(i), PAGE(j)} pair.

The decisions of each classifier come to the antifraud system of the bank, where they can be used to generate alarm messages that have meaning of a warning about the atypical behavior of a particular USER(i) user, or other signals of a similar purpose.

In those embodiments of the present technology, where the computer system does not include an antifraud feature (for example, an online store, a web service for collaboration, a multiplayer computer game), the decisions of the trained at least one classifier can be supplied into the access control system used by the computer system, to the computer workstation panel of the service moderator or information security specialist, or used by the system software to take actions preventing illegal access to the computer system. For example, to initiate a direct connection with the user and request further identifying information (control question, phone number, and so on).

In some non-limiting embodiments of the present technology, such a signal can be generated if there are no typical patterns over a predetermined threshold number of user interface windows opened in the in-use working session, i.e. when there is detected an atypical behavior in the computer system for a predetermined time interval.

In other non-limiting embodiments of the present technology, the computer system may be configured to generate an alarm message in response to one or more most frequently occurred patterns associated with the user being absent for the predetermined time interval.

As noted above, according to certain non-limiting embodiments of the present technology, the computer system associated with implementing the method 100 can include an authorized remote access service including multiple user interface windows or multiple working zones in one complex user interface window and various possible methods to switch between them (both windows and zones).

Computing Device

Figure 2:
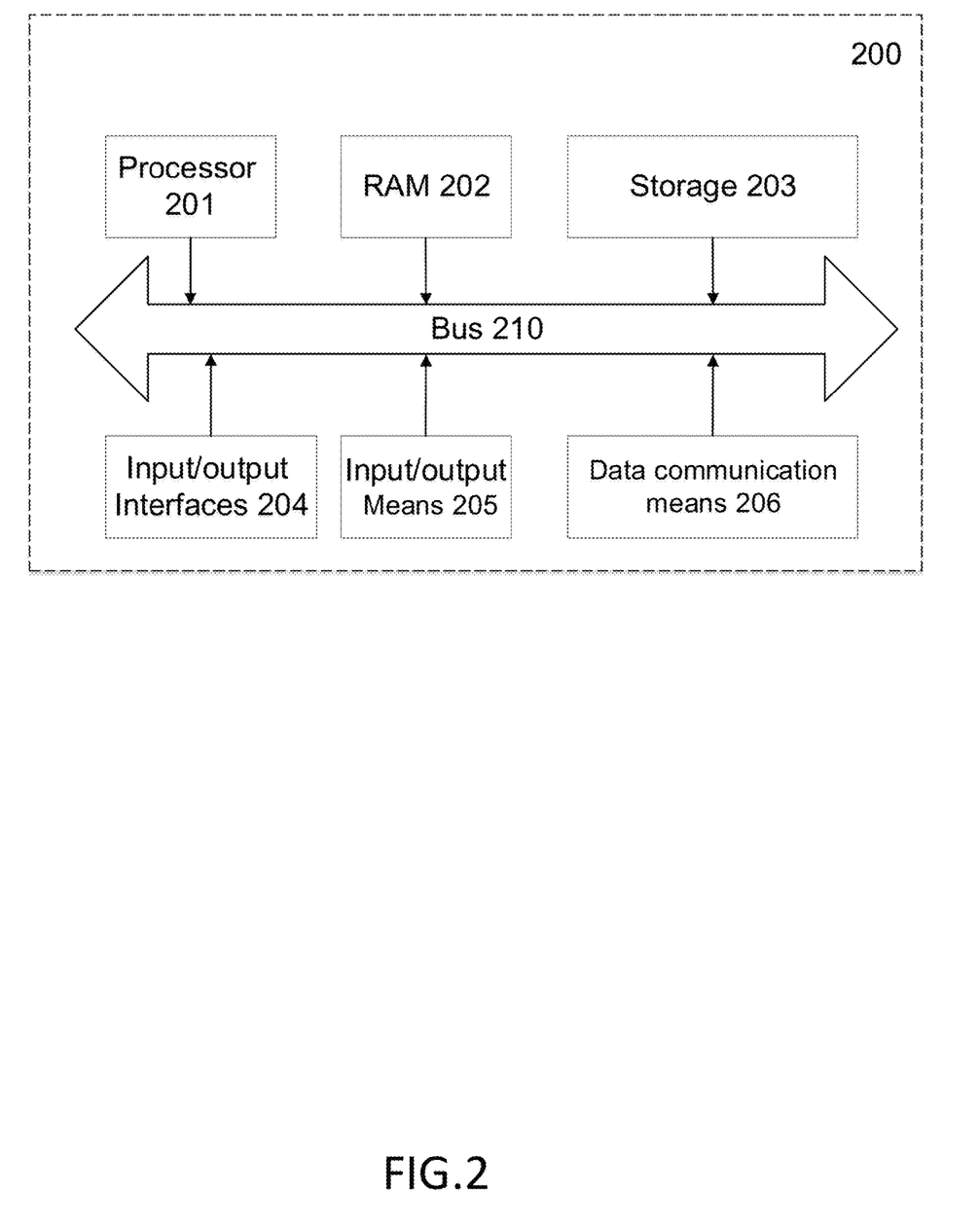
FIG. 2 depicts a schematic diagram of an example computing environment configurable for execution the method of FIG. 1, in accordance with certain non-limiting embodiments of the present technology.

With reference to FIG. 2, there is depicted an example functional diagram of the computing device 200 configurable to implement certain non-limiting embodiments of the present technology including the method 100 described above.

In some non-limiting embodiments of the present technology, the computing device 200 may include: the processor 201 comprising one or more central processing units (CPUs), at least one non-transitory computer-readable memory 202 (RAM), a storage 203, input/output interfaces 204, input/output means 205, data communication means 206.

According to some non-limiting embodiments of the present technology, the processor 201 may be configured to execute specific program instructions the computations as required for the computing device 200 to function properly or to ensure the functioning of one or more of its components. The processor 201 may further be configured to execute specific machine-readable instructions stored in the at least one non-transitory computer-readable memory 202, for example, those causing the computing device 200 to execute the method 100.

In some non-limiting embodiments of the present technology, the machine-readable instructions representative of software components of disclosed systems may be implemented using any programming language or scripts, such as C, C++, C#, Java, JavaScript, VBScript, Macromedia Cold Fusion, COBOL, Microsoft Active Server Pages, Assembly, Perl, PHP, AWK, Python, Visual Basic, SQL Stored Procedures, PL/SQL, any UNIX shell scrips or XML. Various algorithms are implemented with any combination of the data structures, objects, processes, procedures and other software elements.

The at least one non-transitory computer-readable memory 202 may be implemented as RAM and contains the necessary program logic to provide the requisite functionality.

The storage 203 may be implemented as at least one of an HDD drive, an SSD drive, a RAID array, a network storage, a flash memory, an optical drive (such as CD, DVD, MD, Blu-ray), etc. The storage 203 may be configured for long-term storage of various data, e.g., the aforementioned documents with user data sets, databases with the time intervals measured for each user, user IDs, etc.

The input/output interfaces 204 may comprise various interfaces, such as at least one of USB, RS232, RJ45, LPT, COM, HDMI, PS/2, Lightning, FireWire, etc.

The input/output means 205 may include at least one of a keyboard, joystick, (touchscreen) display, projector, touch-pad, mouse, trackball, stylus, speakers, microphone, and the like. A communication link between each one of the input/output means 205 can be wired (for example, connecting the keyboard via a PS/2 or USB port on the chassis of the desktop PC) or wireless (for example, via a wireless link, e.g., radio link, to the base station which is directly connected to the PC, e.g., to a USB port).

The data communication means 206 may be selected based on a particular implementation of the network, and may comprise at least one of: an Ethernet card, a WLAN/Wi-Fi adapter, a Bluetooth adapter, a BLE adapter, an NFC adapter, an IrDa, a RFID adapter, a GSM modem, and the like. As such, the connectivity hardware 504 may be configured for wired and wireless data transmission, via one of WAN, PAN, LAN, Intranet, Internet, WLAN, WMAN, or GSM networks.

These and other components of the computing device 200 may be linked together using a common data bus 210.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

The invention claimed is:

1. A method of user identification of a user of a computing device in a computer system, the computing device being associated with the computer system, the method comprising:
- obtaining a user identifier associated with the user in the computer system;
- assigning a respective window identifier to each user interface window opened by the user on the computing device;
- during a pre-determined number of working sessions of the user on the computing device, for a given working session of the pre-determined number of working sessions: storing a sequence of user interface windows opened by the user, the storing including, for a given user interface window of the sequence of user interface windows:
  - storing a respective window identifier of the given user interface window and a respective timestamp indicative of an opening time of the given user interface window;
- identifying, within user interface windows opened over the pre-determined number of working sessions, at least one pattern including a pre-determined number of repetitive sequences of user interface windows opened by the user over the pre-determined number of working sessions, the identifying comprising:
  - receiving a pre-determined pattern length representative of a number of repetitive sequences of user interface windows in a given pattern;
  - identifying, over the pre-determined number of working sessions, the given pattern having the pre-determined pattern length;
  - determining whether a frequency of occurrence of the given pattern in the pre-determined number of working sessions is no greater than a predetermined frequency threshold;
  - in response to the frequency of occurrence of the given pattern being no greater than the predetermined frequency threshold, including the given pattern in the at least one pattern;
  - in response to the frequency of occurrence of the given pattern being greater than the predetermined frequency threshold:
    - increasing the pre-determined pattern length for the given pattern, thereby determining another pattern; and
    - determining whether the frequency of occurrence of the other pattern in the pre-determined number of working sessions is no greater than the predetermined frequency threshold;
- generating a set of parameters characterizing a time elapsed between a transition from a first user interface window to another user interface window within the given one pattern;
- using the set of parameters associated with the at least one pattern and the user identifier to train at least one classifier to identify the user by an in-use sequence of user interface windows opened therein.

2. The method of claim 1, further comprising using the at least one classifier to identify the user in the computer system during an in-use session, the using comprising:
- receiving data of the in-use sequence of user interface windows including in-use user interface windows having been opened during the in-use session, wherein:
  - each one of the in-use user interface windows is associated with a respective timestamp indicative of a time of opening thereof;
- applying the at least one classifier to the in-use sequence of the user interface windows to determine a likelihood parameter indicative of each of the in-use user interface windows having been opened by the user;
- in response to the likelihood parameter being lower than a pre-determined likelihood threshold, executing one or more pre-determined actions.

3. The method of claim 1, wherein the given user interface window is a web page.

4. The method of claim 1, wherein the at least one pattern has been selected as meeting pre-determined criteria.

5. The method of claim 1, further comprising assigning a weight value to the at least one pattern indicative of an effect of the at least one pattern on a final decision of the at least one classifier.

6. The method of claim 1, wherein the set of parameters further includes an averaged time elapsed between transitions from the first user interface window to the other user interface window over the pre-determined number of working sessions.

7. The method of claim 6, wherein the set of parameters further includes a variance value of time intervals elapsed between the transitions from the first user interface window to the other user interface window over the pre-determined number of working sessions.

8. The method of claim 6, wherein the set of parameters further includes a frequency of occurrence of the at least one pattern in the pre-determined number of working sessions of the user.

9. The method of claim 8, wherein a greater value of the frequency of occurrence has a greater effect on a final decision of the at least one classifier.

10. The method of claim 1, wherein training the at least one classifier is executed by applying one or more machine learning techniques.

11. The method of claim 1, wherein the at least one classifier comprises at least one of a probabilistic graphical model and a Support Vector Machine (SVM) classifier.

12. A system for user identification of a user, the system including a computing device including:
- at least one processor;
- at least one non-transitory computer-readable medium comprising instructions storing executable instructions, which, when executed by the at least one processor, cause the system:
  - obtain a user identifier associated with the user in the computer system;
  - assign a respective window identifier to each user interface window opened by the user on the computing device;
  - during a pre-determined number of working sessions of the user on the computing device, for a given working session of the pre-determined number of working sessions: store a sequence of user interface windows opened by the user including, for a given user interface window of the sequence of user interface windows:
    - a respective window identifier of the given user interface window and a respective timestamp indicative of an opening time of the given user interface window;
  - identify, within user interface windows opened over the pre-determined number of working sessions, at least one pattern including a pre-determined number of repetitive sequences of user interface windows opened by the user over the pre-determined number of working sessions, by:
- receiving a pre-determined pattern length representative of a number of repetitive sequences of user interface windows in a given pattern;
- identifying, over the pre-determined number of working sessions, the given pattern having the pre-determined pattern length;
- determining whether a frequency of occurrence of the given pattern in the pre-determined number of working sessions is no greater than a predetermined frequency threshold;
- in response to the frequency of occurrence of the given pattern being no greater than the predetermined frequency threshold, including the given pattern in the at least one pattern;
- in response to the frequency of occurrence of the given pattern being greater than the predetermined frequency threshold:
  - increasing the pre-determined pattern length for the given pattern, thereby determining another pattern; and
  - determining whether the frequency of occurrence of the other pattern in the pre-determined number of working sessions is no greater than the predetermined frequency threshold;
- generate a set of parameters characterizing a time elapsed between a transition from a first user interface window to another user interface window within the at least one pattern;
- use the set of parameters associated with the at least one pattern and the user identifier to train at least one classifier to identify the user by an in-use sequence of user interface windows opened therein.

13. The system of claim 12, wherein the executable instructions further cause the system to use the at least one classifier to identify the user in the computer system during an in-use session, by executing:
- receiving data of the in-use sequence of user interface windows including in-use user interface windows having been opened during the in-use session, wherein:
  - each one of the in-use user interface windows is associated with a respective timestamp indicative of a time of opening thereof;
- applying the at least one classifier to the in-use sequence of the user interface windows to determine a likelihood parameter indicative of each of the in-use user interface windows having been opened by the user;
  - in response to the likelihood parameter being lower than a pre-determined likelihood threshold, executing one or more pre-determined actions.

14. The system of claim 12, wherein the given user interface window is a web page.

15. The system of claim 12, wherein the at least one pattern has been selected as meeting pre-determined criteria.

16. The system of claim 12, wherein the computing device is an integral part of a remote banking service system.

17. The system of claim 12, wherein the computing device is an integral part of a website including a user authorization feature.

18. The system of claim 12, wherein the computing device is an integral part of a multiplayer computer game including a user authorization feature.

19. The system of claim 12, wherein the computing device is an integral part of a software and hardware system for collaborative work including a user authorization feature.

* * * * *